United States Patent Office 3,531,955
Patented Oct. 6, 1970

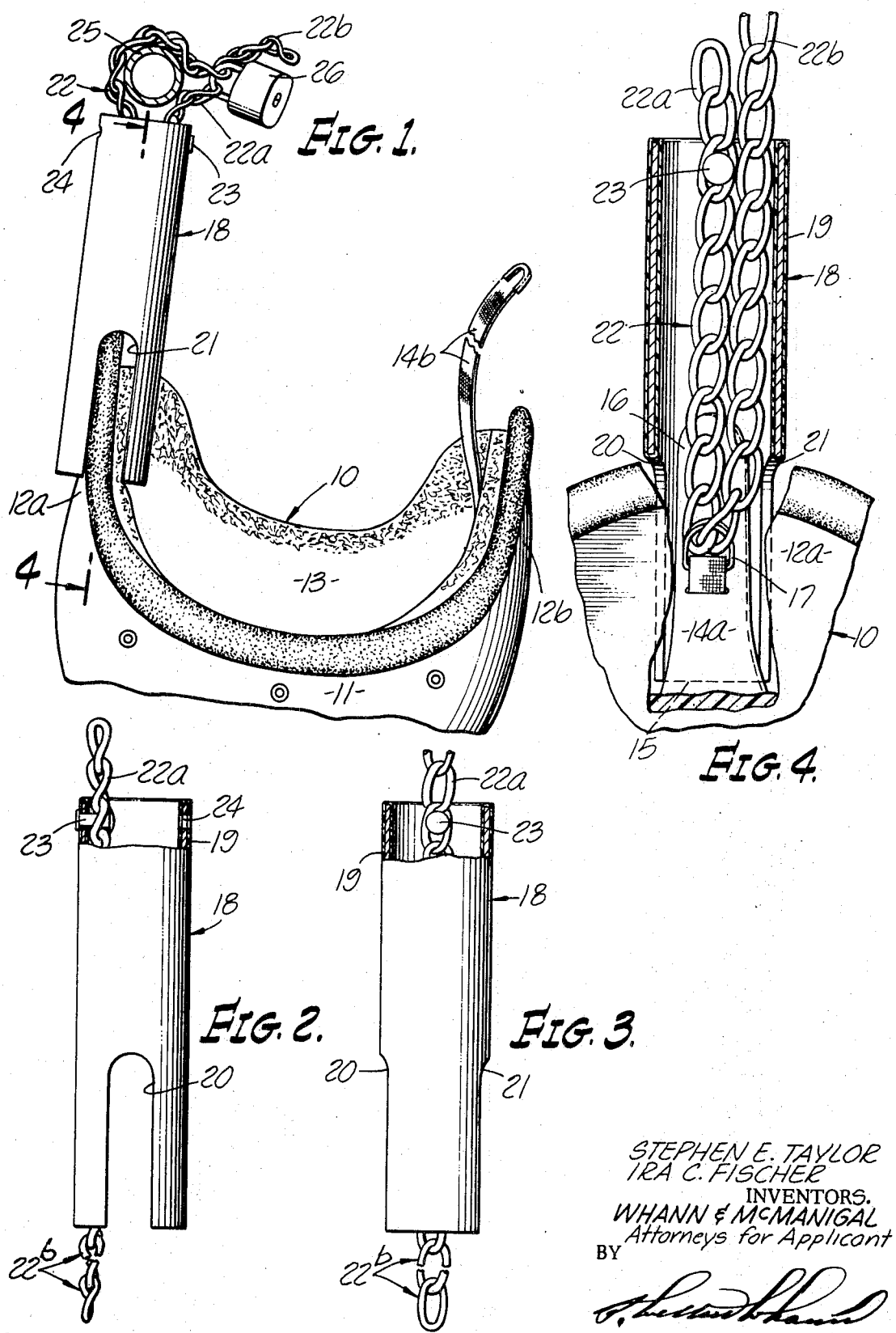

3,531,955
LOCKING DEVICE FOR SAFETY HELMET
Stephen E. Taylor, Burbank, and Ira C. Fischer, Los Angeles, Calif., assignors to Dunleer Corporation, Encino, Calif., a corporation of California
Filed Mar. 28, 1968, Ser. No. 716,915
Int. Cl. E05b 73/00; A42b 3/02
U.S. Cl. 70—59                2 Claims

ABSTRACT OF THE DISCLOSURE

A device for lockingly securing a safety helmet such as a motorcycle crash helmet to a frame member such as a handle bar in which a metal guard tube is slotted at one end to receive edgewise a side part of the helmet and a chin strap part having rings thereon, when drawn thereinto by a chain having one end riveted to the other end of the tube, the unriveted end of the chain being passed through the tube, thence being looped through the rings and carried back through the tube so that the projecting adjacently positioned chain ends can be locked around the frame member and together so as to secure the helmet against theft.

BACKGROUND OF THE INVENTION

The present invention relates to locking devices for securing articles against theft.

Heretofore, it has been known to secure various articles by means of a chain passed through an opening in the article or around a part of the article, the free ends of the chain then being locked together.

In the case of articles such as, for example, a crash helmet for a motorcycle rider, the helmet could be secured to the handle bar or other frame part, when leaving the motorcycle, by passing a chain through one of the chin strap rings, and then locking the chain ends together. Such expedient is not effective, however, for reasons that the ring fastening can be severed by using a sharp knife, whereupon the previously secured helmet can be detached and stolen.

In the present invention, the problem is solved by providing in combination with the chain, a guard member in the form of a sleeve of metal or other hard material such as a plastic which covers the chin strap and makes it inaccessible in the locking position of the device.

SUMMARY OF THE INVENTION

The present invention relates generally to locking devices, and is more specifically concerned with a locking device for a safety helmet such, for example, as may be worn by a motorcycle rider or used by others.

Having in mind the inherent disadvantages and problems of prior art devices for the herein described purpose, it is an object of the present invention to provide a device for lockingly securing portable articles such as a motorcycle rider's safety helmet, and the like against theft, which is simple in construction, economical to manufacture, and which is extremely effective in its operation.

It is a further object to provide a device of the herein described character, which includes a guard member that renders the attaching parts of the secured article and locking means inaccessible in the locked position of the device.

Another object is to provide a motorcycle crash helmet locking device which takes up a minimum of space, and which can be easily stowed when not in use.

Further objects of the invention will be brought out in the following part of the specification wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 1 is a fragmentary view of the crash helmet, and showing a locking device embodying the present invention applied thereto for securing it to a frame member;

FIG. 2 is an elevational view of the locking device of the present invention, portions being broken away to disclose detailed features of construction FIG. 3 is a side elevational view in right-angle relation to that shown in FIG. 2; and FIG. 4 is a fragmentary sectional view taken substantially on line 4—4 of FIG. 1.

DESCRIPTION OF THE PREFERRED EMBODIMENT

Referring more specifically to the drawings, there is shown in FIG. 1 a crash helmet 10 of conventional construction including a crown portion 11 of a protective material such as plastic. As conventionally constructed, the crown portion at opposite sides of the helmet includes projecting portions 12a and 12b which are adapted to extend over and protect the ear areas of the wearer's head. In accordance with the usual practice, the helmet is lined with an inner lining of sponge rubber or other suitable cushioning material as indicated at 13.

The helmet is provided with a retaining chin strap, one portion of the chin strap as indicated at 14a being anchored as by suitable stitching 15 at one end to the adjacent side of the helmet, and having a free end 16 which carries a fastening ring 17 arranged and constructed in accordance with conventional practice. The cooperatively associated portion of the chin strap as indicated at 14b is in the form of an elongate strap member having one end secured as by stitching (not shown) to the opposite side of the helmet structure, this portion of the chin strap having a free end adapted to be connected with the fastening ring 17, when the helmet is worn in the usual manner.

The locking device of the present invention will now be described. As shown in FIGS. 2 and 3, the locking device comprises an elongate tubular member 18 of steel or other suitable stiff hard material which is not easily cut, broken or deformed. If desired, the tubular member may be encased within an outer covering or a shell 19 of suitable plastic or plastisol to provide a pleasing appearance and a surface which will not scratch or otherwise mar the helmet.

At the end of the tubular member 18, which is to be attached to the helmet, the tubular member is provided with end opening elongate slots 20 and 21, these slots being positioned on opposite sides of the tubular member and being transversely aligned. Extending through the tubular member is a length of open linked chain 22, this chain being of greater length than the tubular member 18 so that the opposite ends of the chain as indicated at 22a and 22b will extend beyond the associated ends of the tubular member, as clearly shown in FIGS. 2 and 3. The end portion 22a is anchored to the adjacent end of the tubular member by means of a securing rivet 23. At the same end of the tubular member, there is provided diametrically across from the rivet 23 a wall opening 24.

In utilizing the locking device of the present invention to secure a crash helmet, the end 22b of the chain is passed through the fastening ring 17 as shown in FIG. 4 and then fed in reversed direction through the tubular member 18 so that the end portion 22b will extend out the same end of the tube as the end portion 22a. The strap end 16 with the ring 17 thereon is fed into the slotted end of the tubular member, and the side projection 12a guided into the slots 20 and 21 as tension is applied to the chain end 22b. The side projection of the helmet will reach a seated position in the slots, and, when this happens, the chain end 22b may be looped over a structural member 25 which in this case may be a handle bar of the motorcycle. When the chain slack has been reduced to a minimum, the hasp of a lock 26 may be passed through links of the adjacent chain end portions to secure and lock the device in position for holding the helmet. In the alternative, the hasp of the lock 26 may be passed through the opening 24 and one of the links of the chain end portion 22b in order to secure the device in locked position.

As thus secured, it will be observed that the attaching parts, that is, the chain and ring 17 are positioned well within the tubular member 18 and are rendered inaccessible. It would be very difficult indeed to insert a knife or other cutting tool between the slot of the tubular member and the helmet to cut off the chin strap portion and thus release the helmet.

From the foregoing description and drawings, it will be clearly evident that the delineated objects and features of the invention will be accomplished.

Various modifications may suggest themselves to those skilled in the art without departing from the spirit of our invention, and, hence, we do not wish to be restricted to the specific forms shown or the uses mentioned, except to the extent indicated in the appended claims.

We claim:
1. An article locking device, comprising:
   (a) an elongate tubular member adapted at one end to receive a part of the article therein, and having elongated slots extending from said one end, said slots being transversely aligned and on opposite sides of said one end;
   (b) an elongate flexible member within said tubular member having one end portion adapted to connect with said article part; and
   (c) means for anchoring the flexible member to the tubular member at a point lying within the tubular member.
2. Means for lockingly securing a safety helmet to an associated member, said helmet having a part with an opening therein:
   (a) a hollow member having a first wall opening adapted to receive said part and adjacent portion of said helmet therein, and in the received position to place said part and the opening therein in an inaccessible position within the hollow member; and
   (b) a flexible elongated member permanently secured to the interior of the hollow member with one end portion projecting from the hollow member through a second wall opening and another end portion adapted to be externally threadedly looped through said part opening and carried back through the first wall opening of the hollow member into juxtaposed relation to said one end portion of the flexible member for pulling said part and the adjacent helmet portion into said inaccessible position, and whereby said end portions of said flexible member may be lockingly secured around the associated member.

References Cited
UNITED STATES PATENTS

| | | | |
|---|---|---|---|
| 3,066,372 | 12/1962 | Parker | 24—128 |
| 3,436,936 | 4/1969 | Locker | 70—59 |

RICHARD E. MOORE, Primary Examiner

E. J. McCARTHY, Assistant Examiner

U.S. Cl. X.R.

2—6